US008842605B2

(12) United States Patent
Kasslin et al.

(10) Patent No.: US 8,842,605 B2
(45) Date of Patent: Sep. 23, 2014

(54) NETWORK DISCOVERY IN WIRELESS COMMUNICATION SYSTEMS

(75) Inventors: Mika Kasslin, Espoo (FI); Mikko Tirronen, Helsinki (FI); Kari Leppänen, Helsinki (FI); Sami Virtanen, Espoo (FI); Enrico Rantala, Iittala (FI); Markku Turunen, Helsinki (FI)

(73) Assignee: Nokia Corporation, Espoo (FI)

( * ) Notice: Subject to any disclaimer, the term of this patent is extended or adjusted under 35 U.S.C. 154(b) by 175 days.

(21) Appl. No.: 12/635,284

(22) Filed: Dec. 10, 2009

(65) Prior Publication Data

US 2011/0141965 A1 Jun. 16, 2011

(51) Int. Cl.
*H04W 4/00* (2009.01)
*H04J 3/06* (2006.01)
*H04W 48/16* (2009.01)
*H04W 36/00* (2009.01)

(52) U.S. Cl.
CPC .......... *H04W 48/16* (2013.01); *H04W 36/0088* (2013.01)
USPC ............................ 370/328; 370/350; 370/509

(58) Field of Classification Search
None
See application file for complete search history.

(56) References Cited

U.S. PATENT DOCUMENTS

| 5,371,734 | A  | 12/1994 | Fischer |
| 6,941,372 | B2 | 9/2005  | Pearson |
| 7,567,673 | B2 | 7/2009  | Fukuzawa et al. |
| 7,590,100 | B2 | 9/2009  | Smith et al. |
| 7,774,495 | B2 | 8/2010  | Pabla et al. |
| 7,840,903 | B1 | 11/2010 | Amidon et al. |
| 7,848,277 | B2 | 12/2010 | Chou et al. |
| 7,864,720 | B2 | 1/2011  | Jeyaseelan |
| 7,907,557 | B2 | 3/2011  | Carter |
| 8,005,032 | B2 | 8/2011  | Wang et al. |
| 8,014,378 | B1 | 9/2011  | Yoon et al. |
| 8,165,106 | B2 | 4/2012  | Yang et al. |
| 2002/0101446 | A1 | 8/2002 | Tang et al. |

(Continued)

FOREIGN PATENT DOCUMENTS

| CN | 1571283 | 1/2005 |
| CN | 1728668 | 2/2006 |

(Continued)

OTHER PUBLICATIONS

International Search Report issued Feb. 9, 2011 for PCT/FI2010/50801, 4pp.

(Continued)

*Primary Examiner* — Jutai Kao
(74) *Attorney, Agent, or Firm* — Locke Lord LLP

(57) ABSTRACT

Apparatuses may stay synchronized with a network via a beacon signal transmitted at a set interval. Communication-related activities may be planned around instances when beacon signals are expected, which may also be known as a target beacon transmission time (TBTT). Scanning opportunities, which are periods of time during which apparatuses may perform passive scanning, may be planned based on an interfere multiple of a network beacon signal interval. Apparatuses may, upon realizing a scanning opportunity, opt either to utilize the scanning opportunity or to participate in network beaconing. In example scenarios where apparatuses opt to utilize scanning opportunities, apparatuses may prepare a network information message and then enter a passive scanning mode. Apparatuses may remain in the passive scanning mode for the duration of the scanning opportunity, reacting when messages are received from devices outside of the network by transmitting the network information message.

30 Claims, 11 Drawing Sheets

(56) References Cited

U.S. PATENT DOCUMENTS

| | | |
|---|---|---|
| 2003/0204742 A1 | 10/2003 | Gupta et al. |
| 2004/0153676 A1 | 8/2004 | Krantz et al. |
| 2005/0025092 A1 | 2/2005 | Morioka et al. |
| 2005/0068928 A1 | 3/2005 | Smith et al. |
| 2005/0128988 A1* | 6/2005 | Simpson et al. ............ 370/338 |
| 2005/0193106 A1 | 9/2005 | Desai et al. |
| 2006/0034217 A1 | 2/2006 | Kwon et al. |
| 2006/0050730 A1 | 3/2006 | Shvodian |
| 2006/0120314 A1 | 6/2006 | Krantz et al. |
| 2006/0215588 A1 | 9/2006 | Yoon |
| 2006/0251004 A1 | 11/2006 | Zhong et al. |
| 2006/0285510 A1 | 12/2006 | Kim et al. |
| 2007/0002866 A1 | 1/2007 | Belstner et al. |
| 2007/0086424 A1 | 4/2007 | Calcev et al. |
| 2007/0086426 A1 | 4/2007 | Bonta et al. |
| 2007/0127427 A1* | 6/2007 | Tanaka ......................... 370/338 |
| 2007/0161364 A1 | 7/2007 | Surineni et al. |
| 2007/0226777 A1 | 9/2007 | Burton et al. |
| 2007/0254596 A1 | 11/2007 | Corson et al. |
| 2008/0025512 A1* | 1/2008 | Nakajima ..................... 380/270 |
| 2008/0031208 A1 | 2/2008 | Abhishek et al. |
| 2008/0125190 A1 | 5/2008 | Jan et al. |
| 2008/0130543 A1 | 6/2008 | Singh et al. |
| 2008/0151848 A1 | 6/2008 | Fischer et al. |
| 2008/0261639 A1 | 10/2008 | Sun et al. |
| 2008/0268892 A1 | 10/2008 | Hamdi et al. |
| 2009/0073871 A1 | 3/2009 | Ko et al. |
| 2009/0147702 A1 | 6/2009 | Buddhikot et al. |
| 2009/0156190 A1 | 6/2009 | Fisher |
| 2009/0196180 A1 | 8/2009 | Bahl et al. |
| 2009/0247201 A1 | 10/2009 | Ye et al. |
| 2009/0279449 A1 | 11/2009 | Kneckt et al. |
| 2009/0303926 A1 | 12/2009 | Den Hartog et al. |
| 2009/0310571 A1* | 12/2009 | Matischek et al. ............ 370/336 |
| 2009/0310618 A1 | 12/2009 | Carter |
| 2010/0002608 A1 | 1/2010 | Goldhamer |
| 2010/0110948 A1* | 5/2010 | Batta ........................... 370/311 |
| 2010/0111066 A1* | 5/2010 | Mehta .......................... 370/345 |
| 2010/0138549 A1 | 6/2010 | Goel et al. |
| 2010/0142463 A1 | 6/2010 | Hu |
| 2010/0157827 A1* | 6/2010 | Park et al. ..................... 370/252 |
| 2010/0165947 A1 | 7/2010 | Taniuchi et al. |
| 2010/0189082 A1* | 7/2010 | Choi et al. .................... 370/336 |
| 2010/0226297 A1 | 9/2010 | Kasslin et al. |
| 2010/0226309 A1 | 9/2010 | Kasslin et al. |
| 2010/0246591 A1 | 9/2010 | Gobriel et al. |
| 2010/0302947 A1 | 12/2010 | Leppanen et al. |
| 2010/0304759 A1 | 12/2010 | Leppanen et al. |
| 2010/0332683 A1 | 12/2010 | Das et al. |
| 2011/0038349 A1* | 2/2011 | Sun et al. ..................... 370/331 |
| 2011/0065440 A1 | 3/2011 | Kakani |
| 2011/0141966 A1 | 6/2011 | Kasslin et al. |
| 2011/0142028 A1 | 6/2011 | Kasslin et al. |
| 2011/0142029 A1 | 6/2011 | Kasslin et al. |
| 2011/0222493 A1 | 9/2011 | Mangold et al. |
| 2011/0250857 A1 | 10/2011 | Reial et al. |
| 2011/0250921 A1 | 10/2011 | Reial |
| 2012/0077506 A1 | 3/2012 | Wietfeldt et al. |
| 2012/0225662 A1 | 9/2012 | Jo et al. |

FOREIGN PATENT DOCUMENTS

| | | |
|---|---|---|
| CN | 101601229 | 12/2009 |
| EP | 1361728 | 11/2003 |
| EP | 1396986 | 3/2004 |
| EP | 1545146 A2 | 6/2005 |
| EP | 1703701 | 9/2006 |
| EP | 2107732 A1 | 10/2009 |
| WO | 2004091246 A1 | 10/2004 |
| WO | WO2005006658 | 1/2005 |
| WO | WO2008019140 | 2/2008 |
| WO | WO2008075264 | 6/2008 |
| WO | WO2008094107 | 8/2008 |
| WO | 2009113798 A2 | 9/2009 |
| WO | WO2009135996 | 11/2009 |
| WO | WO2010029386 | 3/2010 |

OTHER PUBLICATIONS

IEEE 802.11-2007, Wireless Medium Access Control (MAC) and Physical Layer (PHY) Specifications, Jun. 2007, Chapter 7.2.3.1. entitled "Beacon frame format", (pp. 80-81).
International Search Report of International App. No. PCT/FI2010/050071—Date of Completion of Search: May 3, 2010, 4 pages.
International Search Report of International App. No. PCT/FI2010/050803—Date of Completion of Search: Feb. 24, 2011, 4 pages.
International Search Report of International App. No. PCT/FI2010/050838—Date of Completion of Search: Jan. 21, 2011, 4 pages.
Gao, X., et al., "Optimal ATIM size for 802.11 networks in ad hoc mode", DoCoMo Communications Lab USA, INFOCOM 2006, Apr. 27, 2006, 3 pages.
Jung, E., et al., "An Energy Efficient MAC Protocol for Wireless LANs", Technical Report TR01-017, Department of Computer Science, Texas A&M University, Jul. 31, 2001, 11 pages.
Wang, Q. et al., "AwareWare: An Adaptation Middleware for Heterogeneous Environments", IEEE Communications Society, 2004, 6 pages.
Wi-Fi Alliance Technical Committee Quality of Service (QoS) Task Group, WMM (including WMM Power Save Specification), Version 1.1 2004, 36 pages.
English Language Machine Translation of Chinese Application Publication No. CN1571283, 9 pages.
English Language Machine Translation of Chinese Application Publication No. CN101601229, 10 pages.
International Search Report for International Application No. PCT/FI2010/050069—Date of Completion of Search: Jun. 4, 2010—4 pages.
International Search Report for International Application No. PCT/FI2010/050838—Date of Completion of Search: Jan. 21, 2011, 4 pages.
Chen, H. et al., IEEE P802.11; doc.:IEEE 802.11-10/0828r0, Wireless LANs, Normative Text for 5 MHz Measurement Pilot Frame, Jun. 2010, 4 pages.
Wang, L. et al., Proposed SFD Text for 802.11ai, doc.:IEEE 11-12-0406-02-00ai; Passive Scanning Improvement, May 4, 2012; 15 pages.
Extended European Search Report for European App. No. 12183977.3—Date of Completion of Search: Jun. 12, 2013, 6 pages.
Cavalcanti, D. et al., "IEEE 80222-07/0121r1: Proposed text changes to Section 6.21.2 Self-coexistence in IEEE 802.22/D0.2 Draft Standard" published in Mar. 2007, 26 pages.
Cordeiro, C. et al., "Cognitive PHY and MAC Layers for Dynamic Spectrum Access and Sharing of TV Bands", published by ACM on Aug. 5, 2006, 11 pages.
International Search Report for International Application No. PCT/IB2010/052403—Date of Completion of Search: Sep. 8, 2010, 4 pages.
English Language Machine Translation of Chinese Application Publication No. CN1728668, 11 pages.

* cited by examiner

NETWORK DISCOVERY IN WIRELESS COMMUNICATION SYSTEMS

BACKGROUND

1. Field of Invention

Embodiments of the present invention pertain to wireless communication, and in particular, to discovering out-of-network apparatuses.

2. Background

Wireless communication has evolved from being a means for verbal information to being more focused on total digital interactivity. Enhancements in wireless technology have substantially improved communication abilities, quality of service (QoS), speed, etc., which has contributed to an insatiable desire for new device functionality. As a result, portable wireless apparatuses are no longer just tasked with making telephone calls. They have become integral, and in some cases essential, tools for managing the professional and/or personal life of users.

In order to support the desired expansion of electronic communication, more and more applications that did not incorporate any communication functionality are being redesigned to support wired and/or wireless communication. Such wireless communication support may, in some instances, include the ability to send monitored or observed data to other apparatuses via wireless communication. Example usage scenarios may include natural resource monitoring, biometric sensors, systems for supporting financial transactions, personal communication and/or location devices, etc. Apparatuses such activities and subsequent communications often operate using limited resources. For example, these apparatuses may be simple (e.g., may have limited processing resources), may be small (e.g., may have space constraints due to size limitations imposed in retrofit applications), may have power constraints (e.g., battery powered), etc.

Link establishment and maintenance processes defined in existing communication protocols may not be appropriate for apparatuses operating with resource constraints such as set forth above. For example, standards for existing wireless communication protocols may require periodic interaction in order to keep apparatuses participating in the network synchronized with other apparatuses. These requirements may not take into consideration the burden that periodic network communication places upon resource-constrained devices. As a result, it may become difficult to operate such resource-constrained apparatuses in accordance with these standards.

SUMMARY

Example embodiments of the present invention may be directed to a method, apparatus, computer program and system for facilitating apparatus interaction while conserving apparatus resources. In accordance with at least one example implementation, apparatuses may stay synchronized with a network via a beacon signal that is transmitted at a set interval. Various communication-related activities may be planned around an instance when a beacon signal is expected, which may also be known as a target beacon transmission time (TBTT). While some networked apparatuses may be able to be active during every TBTT, other apparatuses may find this practice too burdensome due to the resources required by such behavior. In this regard, a reduced or diluted beacon period, based on an integer multiple of the network beacon signal interval, may also be established that may lessen the communication burden on apparatuses since the need to communicate is less frequent. Similarly, scanning opportunities are periods of time during which apparatuses may perform passive scanning that may also be initiated based on, and may have durations defined in terms of, integer multiples of the network beacon signal interval.

In accordance with at least one example embodiment of the present invention, apparatuses may, upon identifying a scanning opportunity, opt either to utilize the scanning opportunity or to participate in network beaconing (e.g., when a scanning opportunity occurs during a TBTT also associated with a diluted beacon period). In example scenarios where apparatuses opt to utilize a scanning opportunity, apparatuses may prepare a network information message prior to entering a passive scanning mode. These apparatuses may remain in the passive scanning mode for the duration of the scanning opportunity, reacting in scenarios where messages are received from devices outside of the network. For example, apparatuses may receive beacon signals from other networks identified, for example, by having a different set identifier (SSID), that may trigger transmission of the network information message. Prior to transmission, network information messages may be altered to include SSIDs corresponding to received beacon signals.

The network information messages may comprise communication configuration information usable by apparatuses outside of the network for interacting with apparatuses in the network. For example, beacon period information may be provided so that outside apparatuses may synchronize to the timing of the network. Beacon period information may also comprise reduced beacon period information for apparatuses that desire/need to interact less frequently.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

The disclosure will be further understood from the following description of various exemplary embodiments, taken in conjunction with appended drawings, in which.

DESCRIPTION OF EXEMPLARY EMBODIMENTS

While the present invention has been described herein in terms of a multitude of example embodiments, various changes or alterations can be made therein without departing from the spirit and scope of the present invention, as set forth in the appended claims.

Figure 1:
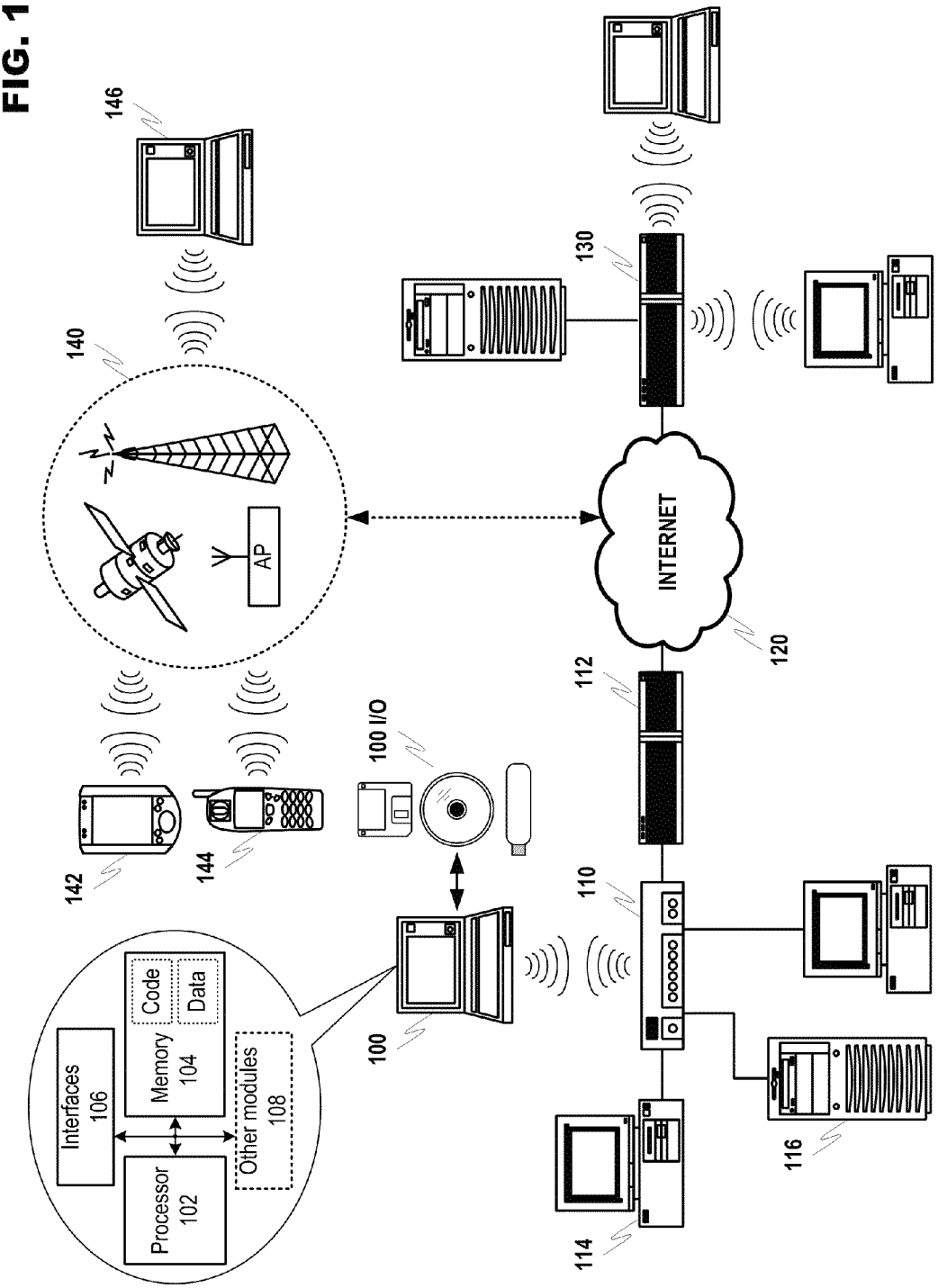
FIG. 1 discloses examples of hardware and software resources that may be utilized when implementing various example embodiments of the present invention.

I. General System with which Embodiments of the Present Invention May be Implemented An example system usable as a basis for explaining the various embodiments of the present invention is disclosed in FIG. 1. The apparatuses and configurations shown in FIG. 1 are merely representative, and thus, may be included in, or omitted from, actual implementations.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may comprise one or more components configured to execute instructions, for instance, wherein a group of instructions may constitute program code. In at least one scenario, the execution of program code may include receiving input information from other elements in computing device 100 in order to formulate an output (e.g., data, event, activity, etc). Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired and/or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks also shown in FIG. 1. For example, communication hub 110 may provide wired and/or wireless support to devices such as computer 114 and server 116. Communication hub 110 may also be coupled to router 112, allowing devices in the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may interact with computing device 100 over Internet 120 as facilitated by wireless communication 140. Similar functionality may be also be included in other apparatuses, such as laptop computer 146, in the form of hardware and/or software resources configured to allow short and/or long range wireless communication.

II. Example Networking Environment

Figure 2:
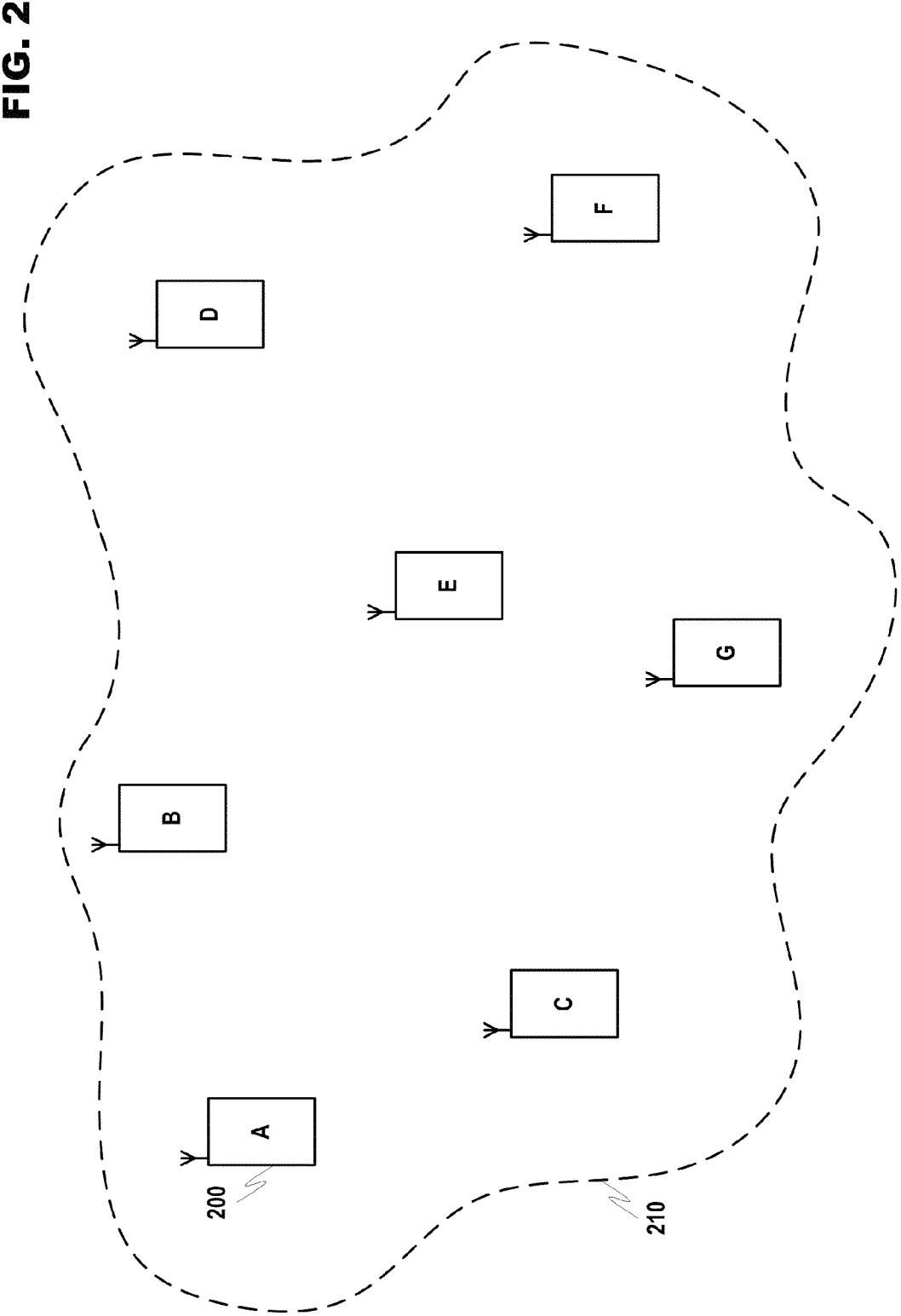
FIG. 2 discloses an example network environment in accordance with at least one example embodiment of the present invention.

FIG. 2 discloses an example of an operational space that will be used to explain the various example embodiments of the present invention. As this example scenario is utilized herein only for the sake of explanation, implementations of the present invention are not limited specifically to the disclosed example. Operational spaces may be defined using different criteria. For example, physical areas like buildings, theatres, sports arenas, etc. may define a space where users may interact. Alternatively, operational spaces may be defined in terms of apparatuses that utilize particular wireless transports, apparatuses that are within communication range (e.g., a certain distance) of each other, apparatuses that are members of certain classes or groups, etc.

Wireless-enabled apparatuses 200 are labeled "A" to "G" in FIG. 2. Apparatuses 200 may, for example, correspond to any of the wireless-enabled apparatuses that were disclosed in FIG. 1, and may further include at least the resources discussed with respect to apparatus 100. These apparatuses may further operate utilizing at least one common wireless communication protocol. That is, all of the apparatuses disclosed in FIG. 2 may interact with each other within the operational space, and thus, may participate together in a wireless communication network.

III. Examples of Messaging

Figure 3:
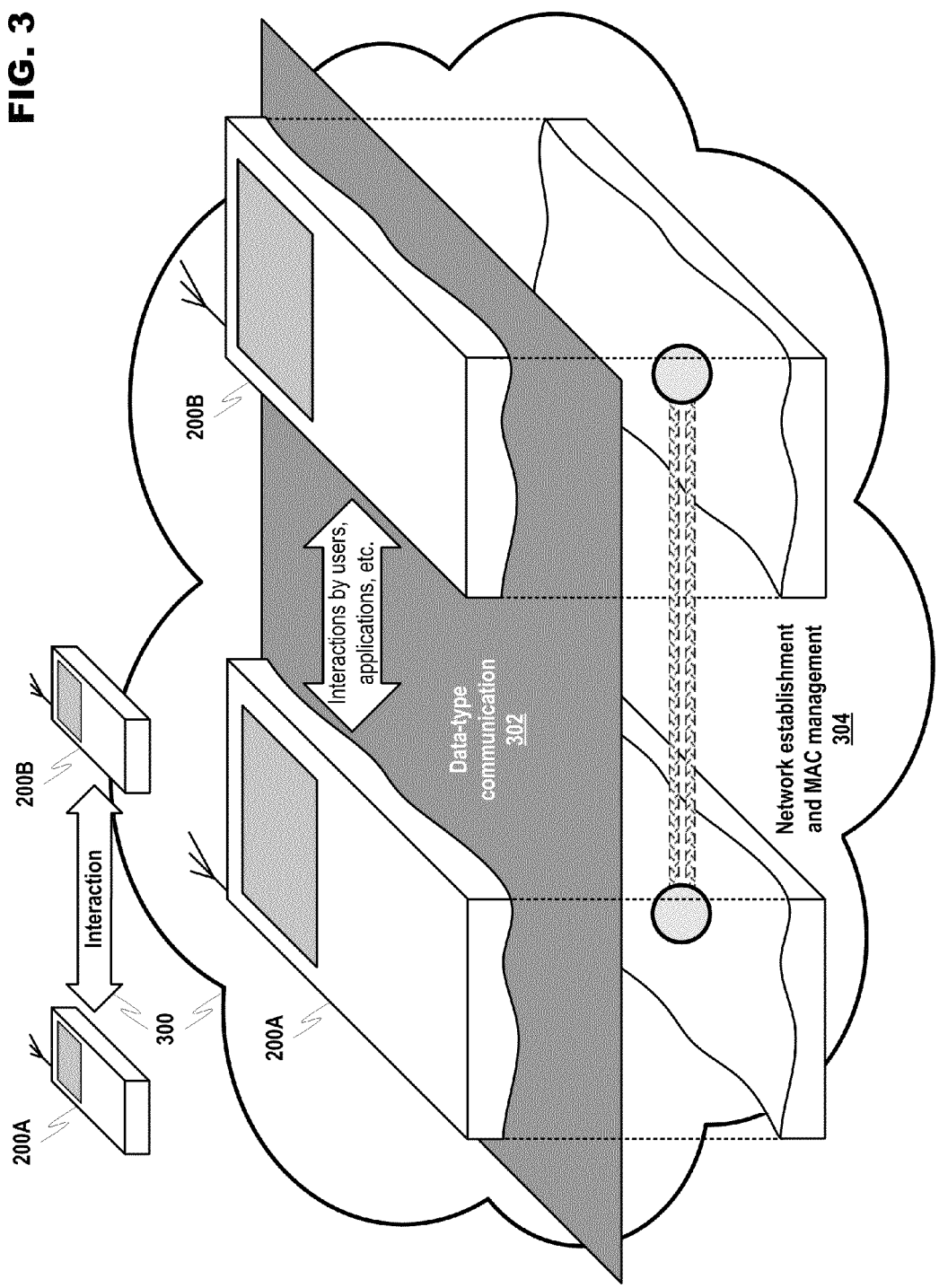
FIG. 3 discloses examples of various types of messaging that may be utilized in accordance with at least one example embodiment of the present invention.

An example communication between apparatuses in accordance with at least one embodiment of the present invention is disclosed at 300 in FIG. 3. While only two apparatuses 200A and 200B are shown, the example disclosed in FIG. 3 has been presented for explanation only, and is not intended to limit the scope of the present invention. Various embodiments of the present invention may readily facilitate wireless interaction between more than two apparatuses.

Additional detail with respect to communication example 300 is disclosed further in FIG. 3. Apparatus 200A may have communication requirements that require interaction with apparatus 200B. For example, these requirements may comprise interactions by apparatus users, applications residing on the apparatuses, etc. that trigger the transmission of messages that may be generally classified under the category of data-type communication 302. Data-type communication may be carried out using messages that may be wirelessly transmitted between apparatus 200A and 200B. However, typically some form of wireless network link or connection needs to be established before any data type communication messages 302 may be exchanged.

Network establishment and media access control (MAC) management messages 304 may be utilized to establish and maintain an underlying wireless network architecture within an operating space that may be utilized to convey data type communication messages 302. In accordance with various example embodiments of the present invention, messages containing apparatus configuration, operation and status information may be exchanged to transparently establish wireless network connections when, for example, an apparatus enters an operating space. Network connections may exist between any or all apparatuses existing within the operating space, and may be in existence for the entire time that an apparatus resides in the operating space. In this way, data-type communication messages 302 may be conveyed between apparatuses using existing networks (new network connections do not need to be negotiated each time messages are sent), which may reduce response delay and increase quality of service (QoS).

Figure 4:
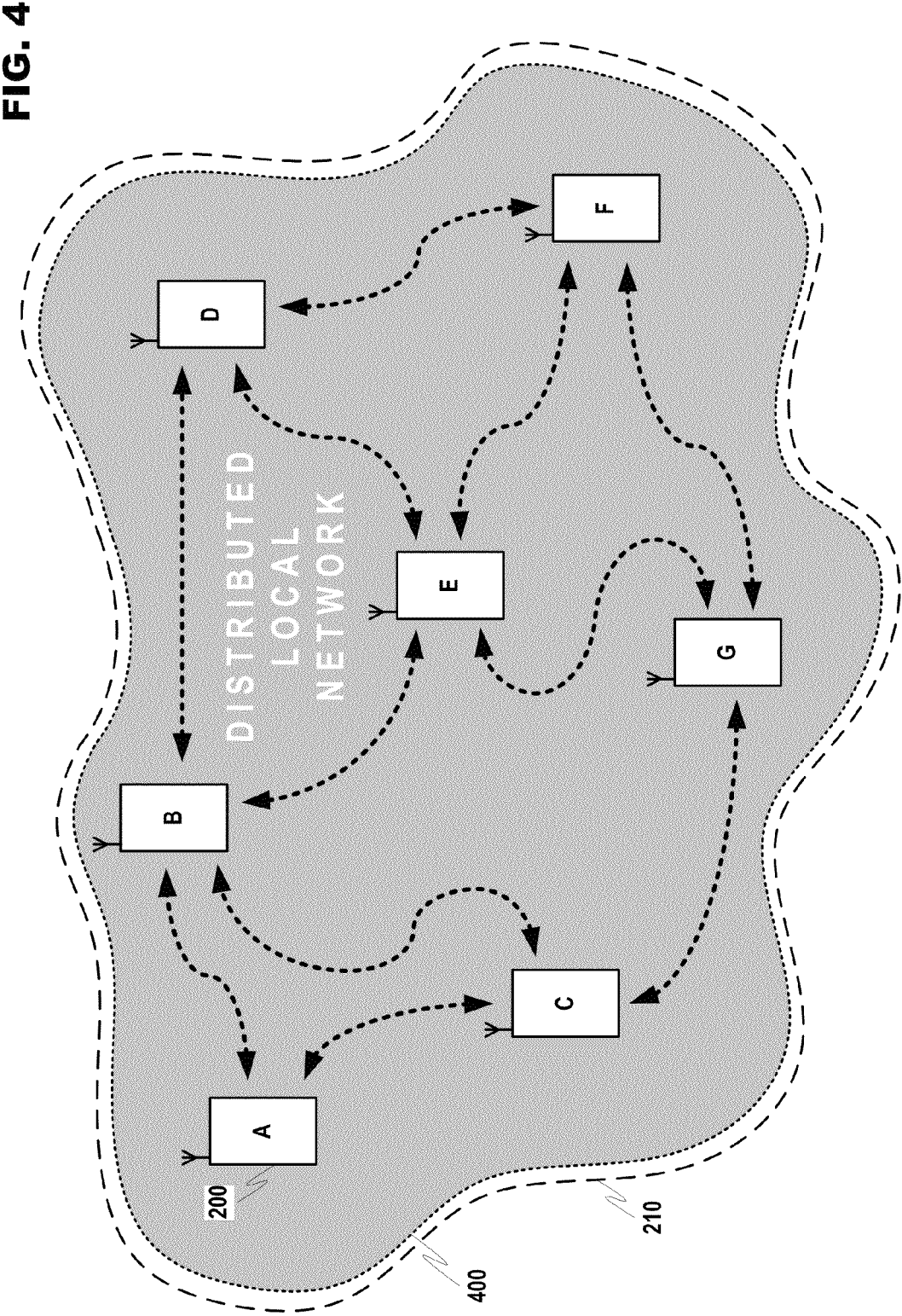
FIG. 4 discloses an example of inter-apparatus message propagation, which may result in distributed local web formation, in accordance with at least one example embodiment of the present invention.

In accordance with at least one embodiment of the present invention, an example of distributed local network formation via automated network establishment and MAC management messages 304 is disclosed in FIG. 4. Apparatuses 200 entering into operational space 210 may immediately initiate network formation through the exchange operational information. Again, the exchange of this information may occur without any prompting from, or even knowledge of, a user. Example interactivity is shown in FIG. 4, wherein various network establishment and MAC management messages 304 are exchanged between apparatuses A to G. In accordance with at least one example embodiment of the present invention, messages may be exchanged directly between an originating apparatus (e.g., the apparatus that is described by information elements contained in a message) and a receiving apparatus. Alternatively, messages corresponding to apparatuses in operational space 210 may be forwarded from one apparatus to another, thereby disseminating the information for multiple apparatuses.

IV. Example Operational Parameter: Diluted Beacon Period

Figure 5:
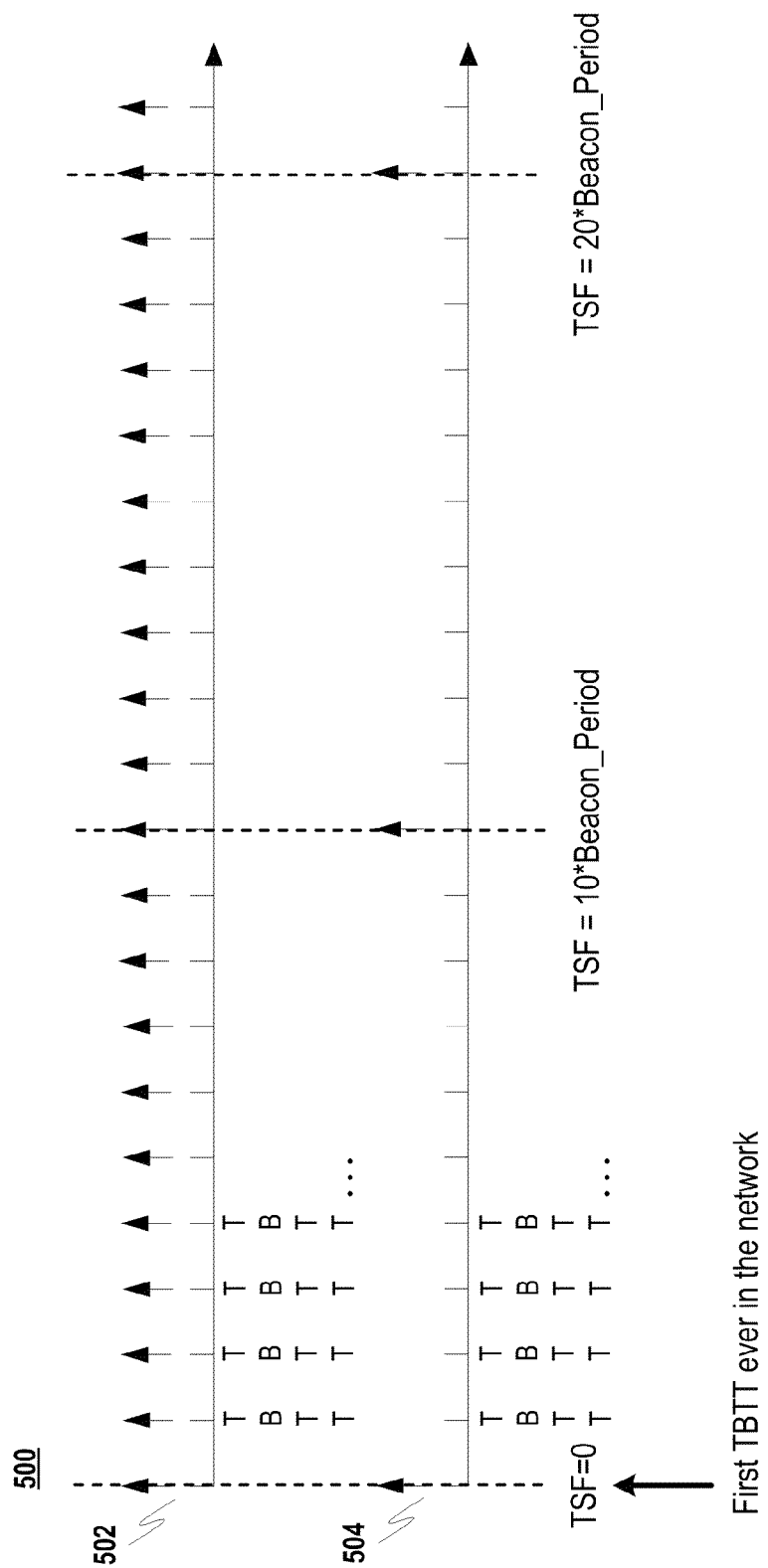
FIG. 5 discloses example beacon implementations that are usable in accordance with at least one example embodiment of the present invention.

An example of information that may be communicated in network establishment and MAC management messages 304 (e.g., using information elements), in accordance with at least one example embodiment of the present invention, is disclosed in FIG. 5. The activity flow disclosed at 500 represents an example implementation based on the wireless local area networking (WLAN) standard, as defined in the IEEE 802.11 specification. However, embodiments of the present invention are not limited only to implementation with WLAN, and thus, may be applied to other wireless network architectures or communication protocols.

The WLAN logical architecture comprises stations (STA), wireless access points (AP), independent basic service sets (IBSS), basic service sets (BSS), distribution systems (DS), and extended service sets (ESS). Some of these components map directly to hardware devices, such as stations and wireless access points. For example wireless access points may function as bridges between stations and a network backbone (e.g., in order to provide network access). An independent basic service set is a wireless network comprising at least two stations. Independent basic service sets are also sometimes referred to as an ad hoc wireless network. Basic service sets are wireless networks comprising a wireless access point supporting one or multiple wireless clients. Basic service sets are also sometimes referred to as infrastructure wireless networks. All stations in a basic service set may interact through the access point. Access points may provide connectivity to wired local area networks and provides bridging functionality when one station initiates communication to another station or with a node in a distribution system (e.g., with a station coupled to another access point that is linked through a wired network backbone).

In wireless network architectures like WLAN, beacon signals may be utilized to synchronize the operation of networked apparatuses. In situations where new ad hoc networks are being created, the initiating apparatus may establish standard network beaconing based on it owns clock, and all apparatuses that join the network may conform to this standard beacon. Similarly, apparatuses that desire to join an existing wireless network may synchronize to the existing beacon. In the case of WLAN, apparatuses may synchronize to beacon signals utilizing a timing synchronization function (TSF). The timing synchronization function is a clock function that is local to an apparatus that synchronizes to and tracks the beacon period.

An example of a beacon signal is shown in FIG. 5 at 502 wherein a target beacon transmission time (TBTT) indicates the targeted beacon transmission. This time may be deemed "targeted" because the actual beacon transmission may be a somewhat delayed from the TBTT due to, for example, the channel being occupied at TBTT. The apparatuses that are active in the network may communicate with each other in accordance with the beacon period (time between two beacon transmissions). However, there may be instances where it may not be beneficial, and may possibly even be detrimental, for apparatuses to be active during each beacon period. For example, apparatuses that do not expect frequent communication within the wireless network may not benefit from being active for every beacon period. Moreover, apparatuses with limited power or processing resource may be forced to waste these precious resources by the requirement of being active for every beacon period.

In accordance with at least one embodiment of the present invention, functionality may be introduced utilizing the example distributed wireless network described above to allow apparatuses to operate at a standard beaconing rate that has been established in the network, or alternatively, using a "diluted" beaconing rate. "Diluted" beaconing may comprise a beaconing mode operating at a lower frequency than the standard beaconing rate originally established in the network. Diluted beaconing may be based on information (e.g., information elements) that is included in network beacon frames, wherein the included information may express one or more diluted beacon rates as multiples of the beacon. Using the beacon and the one or more associated diluted beacon period indications contained within beacon frames, networked apparatuses may elect to operate (e.g., via random contention) based either on the standard beacon or a diluted beacon period. In particular, all apparatuses may synchronize to the same initial target beacon transmission time (TBTT), for example when TSF=0, and may then count the number periods that occur after the initial TBTT based on the internal TSF function. In this way, apparatuses operating using a diluted beacon period may be active on TBTT counts that corresponds to the multiple defined by the diluted beaconing period.

An example diluted beacon interval of every $10^{th}$ TBTT is disclosed in FIG. 5 at 504. The decision on a beacon interval to utilize may be handled by each apparatus individually, (e.g., in the protocol stacks that manage operation of a radio modem). All apparatuses will then, in accordance with at least one embodiment of the present invention, operate based on a beacon interval that remains the same for the lifetime of the network. In view of the requirement that the beacon interval remain unchanged for the duration of the wireless network, the diluted beacon signal may be expressed as a multiple of the beacon signal. Starting intervals may be defined by the apparatus that formed the network, and in the example disclosed in FIG. 5 (and as previously set forth) the first TBTT is equivalent TSF=0. Other apparatuses that subsequently join the network may adopt this beacon interval parameter and TBTT timing. For example, the TBTT at TSF=0 is the "base point" that determines when beacons are transmitted. All the devices in the network may update their own TSF counters as per legacy synchronization rules, and from the TSF they may determine the particular TBTT in which to participate in beaconing assuming that, regardless of the beacon interval, the first beacon was transmitted at TSF=0.

For example, in a network comprising four apparatuses where devices 1, 2 and 4 operate using a diluted beaconing mode having a beacon interval (e.g., a time period between beacon transmissions) of every $6^{th}$ TBTT, all apparatuses may remain synchronized even though only device 3 may be active (e.g., "competing") in all beaconing periods 1, 2, 3, 4 and 5 (e.g., all apparatuses may participate in TBTT 0, TBTT 6, TBTT 12, etc.) Therefore, there can be at least two different beacon periods among the apparatuses, and possibly further diluted beacon periods as other groups of apparatuses may have selected their own diluted beaconing period based on the original beaconing period and the one or more associated diluted beacon period indications transmitted therewith.

In accordance with at least one example embodiment of the present invention, beacons will contain a diluted beacon period parameter. The diluted beacon period parameter may, for example, be carried in vendor-specific information elements (IEs). Diluted beacon period parameter values may remain the same for the lifetime of the network. However, should there be need for more flexibility, other beacon intervals may be defined, and all of the defined beacon intervals may be signaled in a manner similar to the diluted beacon interval.

V. Examples of Awake Windows

Figure 6:
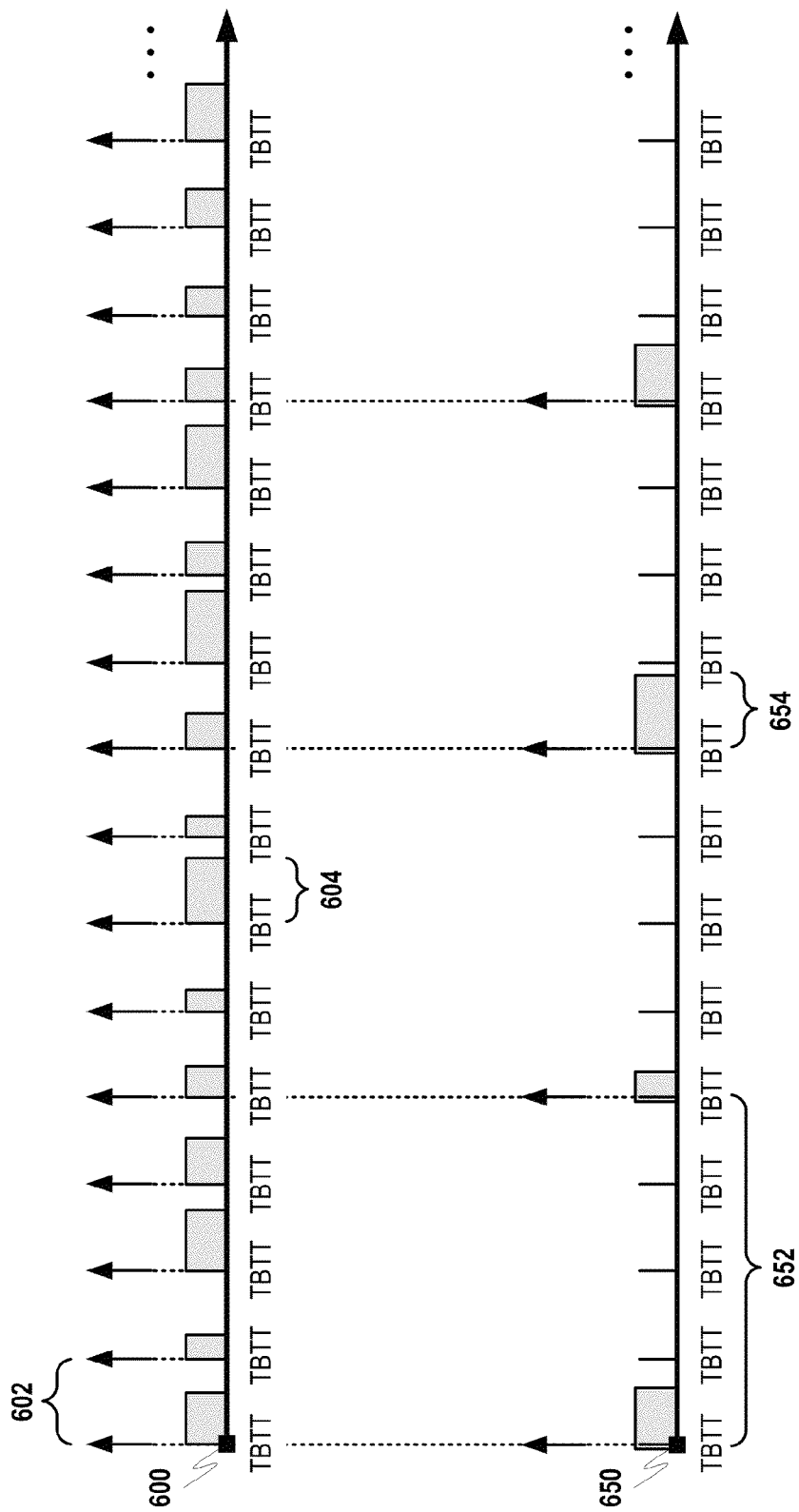
FIG. 6 discloses an example of awake windows in accordance with at least one example embodiment of the present invention.

FIG. 6 discloses an example implementation of "awake windows" in accordance with at least one embodiment of the present invention. Similar to FIG. 5, a "standard" network beacon (e.g., the beacon established by the apparatus that formed the network) is shown at 600. Each target beacon transmit time (TBTT) may represent a beacon frame that is transmitted by an apparatus in the network (or at least times at which beacon transmissions were targeted, barring any delays). Thus, the interval shown at 602 may therefore define the standard beacon period.

Possible awake windows for an apparatus that is participating in the network are further shown in FIG. 6, an example of which is identified at 604. These active periods occur in accordance with each transmitted TBTT, and therefore, may be deemed aligned with the normal network beacon period. These awake windows do not necessarily represent that an apparatus has planned activity (e.g., messages queued for transmission) during these time periods. On the contrary, they are merely periods of time when apparatuses may be active, and therefore, will be able to transmit messages to, and/or receive messages from, other apparatuses in the network.

The behavior of another example apparatus in accordance with at least one embodiment of the present invention is further disclosed at 650. While all apparatuses in the network will operate based on the same origin point (e.g., TSF=0) and normal beacon period (e.g., as set forth by the TBTT), each apparatus may select an operational mode based upon the one or more diluted beacon period indications that are transmitted in the beacon. For example, the apparatus corresponding to the activity disclosed at 650 is operating utilizing diluted beacon period 652, which is a multiple "4" in this scenario. Therefore, diluted beacon period 652 may involve beacon transmissions per every four TBTTs. Awake windows, for example as shown at 654, may also occur in accordance with the diluted beacon period 652. In at least one example implementation, the awake windows may begin just prior to the commencement of the diluted beacon period.

The duration of awake windows, while configured at constant duration by a predetermined information element (IE) in the beacon, may end up being variable in actual practice. For example, the awake window may be based on a MAC parameter that is similar to the beacon interval and diluted beacon period parameters. A host in the beaconing apparatus may determine it and provides it to the modem for transmission in the beacon. It may be communicated using, for example, a general or vendor specific information element (IE) as with the beacon interval and diluted beacon period. Upon awake window expiration apparatuses may attempt to transition to a "doze" or sleep state. However, the transition to doze state may, in actuality, happen earlier or later in accordance with control methodologies that will be discussed with respect to FIG. 7-8.

Figure 7:
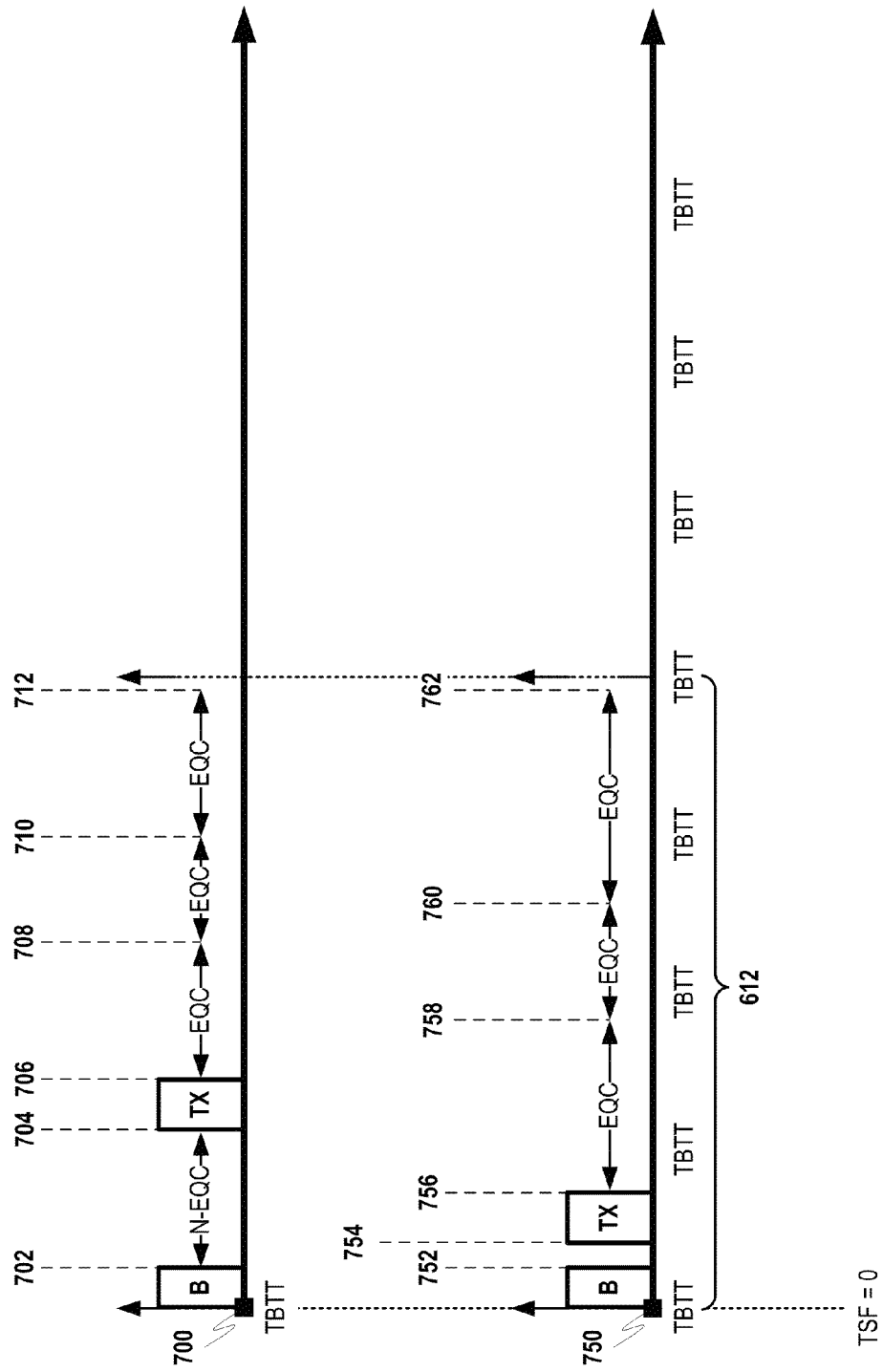
FIG. 7 discloses examples of access control strategies in accordance with at least one example embodiment of the present invention.

FIG. 7 discloses channel access control configurations that may be implemented in accordance with at least one embodiment of the present invention. Initially two channel access states may be defined: a non-empty queue contention (N-EQC) state and an empty queue contention (EQC) state. When apparatuses have no messages (frames) queued for transmission in transmit buffers, the device may be deemed in an EQC state. Alternatively, apparatuses may be deemed in an N-EQC state when there is at least one frame awaiting transmission.

The N-EQC state may comprise optional implementations: "Legacy" 700 and "Beacon Prioritized" 750. Using Legacy implementation 700, upon receiving or transmitting a beacon channel contention may be executed as in legacy devices, for example, as defined by the channel access rules specified in the particular wireless communication medium. Legacy implementation 700 represents an example of channel contention in accordance with an existing set of access control rules between 702 and 704. Once the apparatus gains access to media at 704 it will obtain a transmission opportunity (TXOP) during which it may transmit frames to the network (e.g., if one or more frames are queued for transmission. "TX"

as shown between 704 and 706 in FIG. 7 represents the transmission of any queued messages. Further, frames may be received from the network as acknowledgements to the transmitted frames in the "TX" period.

In Beacon Prioritized implementation 750, the apparatus that has transmitted the network beacon is permitted to continue transmitting any frames that are queued for transmission in its transmit buffers. The apparatus obtains a TXOP for beacon transmission, and once it has transmitted the beacon at 752 it may automatically obtain a new TXOP, as shown at 754, to transmit any frames that are pending in its transmit buffers. In the disclosed example the new TXOP may start after a short interframe space (SIFS) period following the end of the beacon frame, which is represented in example 750 by the space shown between 752 and 754.

Once the apparatus has completed transmission (e.g., emptied its transmission buffers), it shall enter into an EQC state as shown in implementations 700 and 750 at 706 and 756, respectively. If an apparatus has no frames for transmission during a beacon interval, the device transition directly into an EQC state after the beacon reception/transmission (e.g., at 702, 752). When in the EQC state apparatuses may try to obtain a TXOP for a given number of times (determined, for example, by a "RepeatEmptyQueueContention" parameter). Upon obtaining a TXOP, apparatuses without pending messages may attempt to obtain a new TXOP as shown at 708/710 and 758/760 in implementations 700 and 750, respectively, instead of initiating the transmission of a frame sequence. Devices that obtain a number of TXOPs that is equal to a predetermined threshold value (e.g., RepeatEmptyQueueContention times) during a beacon interval may enter into doze or sleep state. In example implementations 700 and 750 in FIG. 7 this may occur at 712 and 762, respectively. All of these events may happen before awake window 612 expires. Moreover, example legacy implementation 700 and example beacon prioritized implementation 750 both assume that the message transmissions between 704 and 706, as well as 754 and 756, respectively, succeed, and thus, no frames are pending for (re)transmission beyond this point.

VI. Scanning Opportunity Establishment, Usage and Related Communication

Figure 8:
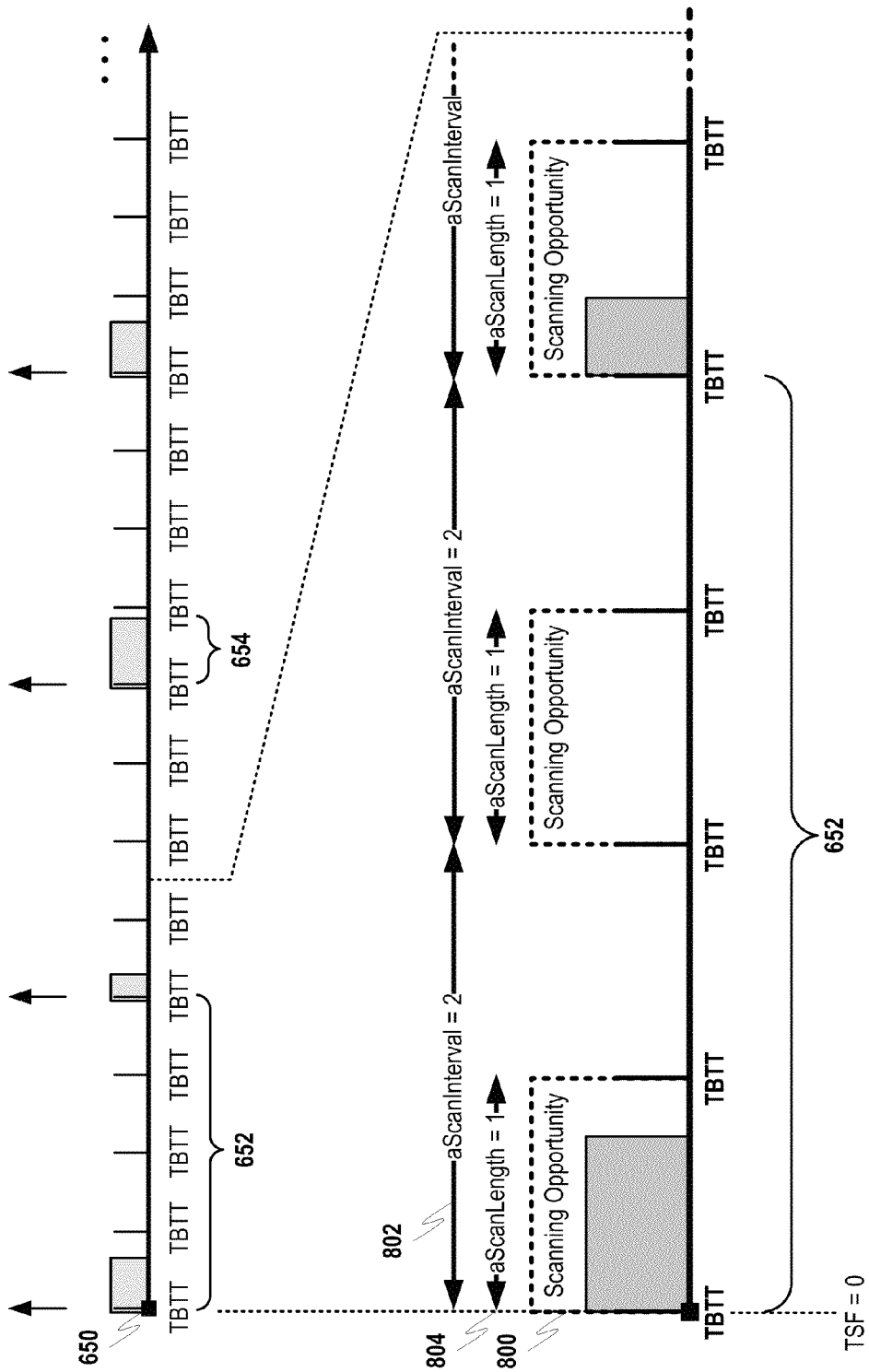
FIG. 8 discloses example scanning opportunity initialization and duration in accordance with at least one example embodiment of the present invention.

The previous discussion addressed awake periods that may occur in accordance with a diluted beacon period according to at least one embodiment of the present invention. A diluted beacon period may allow apparatuses in the network to operate less frequently, which may lessen resource usage and extend operational life. Another periodic operation that may operate alone or in conjunction with diluted beacon periods involves scanning opportunities. FIG. 8 explodes a portion of the activity flow previously shown at 650 in order to explain scanning opportunities 800. Scanning opportunities 800 represent periods of time during which apparatuses may engage in passive scanning. Scanning opportunities 800 may be initiated periodically based on an integer multiple of the network beacon signal interval (e.g., beginning from TSF=0), which may be defined in terms of the parameter aScanInterval 802 in FIG. 8. This parameter is set to "2" in the disclosed example, which means that scan opportunities will initiate on the occurrence of every other TBTT based on the network beacon signal interval. Since the diluted beacon period is set to "4" in the example embodiment of FIG. 8, a diluted beacon period will occur during every other scanning opportunity in the disclosed example.

The duration of scanning opportunity 800 may also be defined based on an integer multiple of the network beacon signal interval. In the example embodiment of FIG. 8, duration is configured by the parameter aScanLength 804 being set to "1" or one standard beacon period in the network. Any occurrence of shaded areas within scanning opportunities 800 correspond to example apparatus awake windows shown in 650 that happen to initiate at the same TBTT as scan windows 800.

An opportunity for an apparatus to be active in a network (e.g., for beaconing in accordance with the standard or diluted beacon period) may be presented during the same TBTT as scanning opportunity 800. However, in accordance with various embodiments of the present invention, apparatuses may opt not to participate in active network operations like beaconing in order to perform passive scanning. Example scanning operations, such as will be described below, may facilitate network expansion through scanning coupled with a response mechanism for conveying connectivity information to other apparatuses that may want to join the network.

Figure 9:
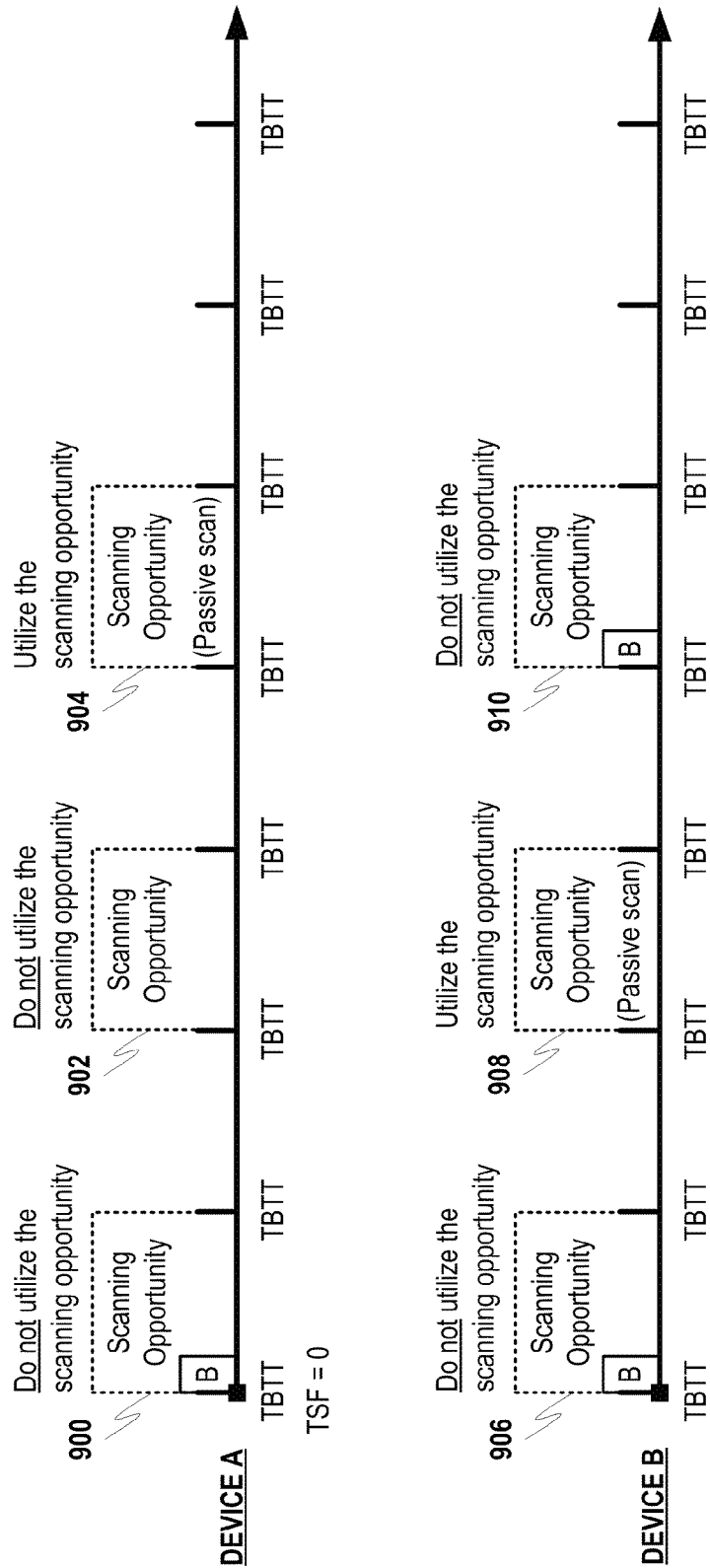
FIG. 9 discloses examples of scanning opportunity utilization, and a possible lack of utilization, in accordance with at least one example embodiment of the present invention.

An example of scanning opportunity operation is disclosed with respect to FIG. 9. Both devices A and B are operating using a aScanInterval=2 that causes scanning opportunities to initiate every other TBTT, and each scanning opportunity has a duration (aScanLength) of one network beacon signal interval. Initially, device A elects not to utilize scanning opportunity 900. Therefore, device A may participate in standard network beaconing as defined by the communication protocol in use. However, according to at least one example embodiment, data transmission is not permitted for apparatuses engaged in a scanning opportunity, aside from beaconing, so device A may return to sleep mode after a beacon is transmitted. Device A again opts to not utilize the scanning opportunity at 902, but upon the occurrence of the next scanning opportunity 904 device A may opt to utilize the scanning opportunity. As a result, device A may perform passive scanning during scanning opportunity 904. Utilizing a scanning opportunity may, in accordance with at least one embodiment of the present invention, also incorporate other activities in addition to simple passive scanning. Examples of activities that may occur when a scanning opportunity is utilized will be described with respect to FIG. 10.

As opposed to the operation described with respect to device A in FIG. 9, device B opts not to utilize either of the scanning opportunities shown at 906 and 910. Instead, in both instances device B participates in network beaconing. During scanning opportunities 906 and 910 device B participates in network beaconing and does not transmit further information. In the second scanning opportunity 908, device B opts to utilize the scanning opportunity in the manner described above in regard to scanning opportunity 904. Apparatuses in the same network may stagger operation so that some apparatuses passively scan while others are actively beaconing.

Further to the above example, apparatuses such as device A and B disclosed in FIG. 9 would most probably not utilize every scanning opportunity for passive scanning when supporting wireless protocols like WLAN. Instead, an average of one out of aScanProbability (e.g., a parameter that defines the probability that a scanning opportunity will be utilized) of the scanning opportunities will be utilized. Therefore, the probability that apparatuses perform a scan in a single scan opportunity may be defined as 1/aScanProbability, and an apparatus may decide on the occurrence of each separate scanning opportunity whether to utilize it for scanning.

Figure 10:
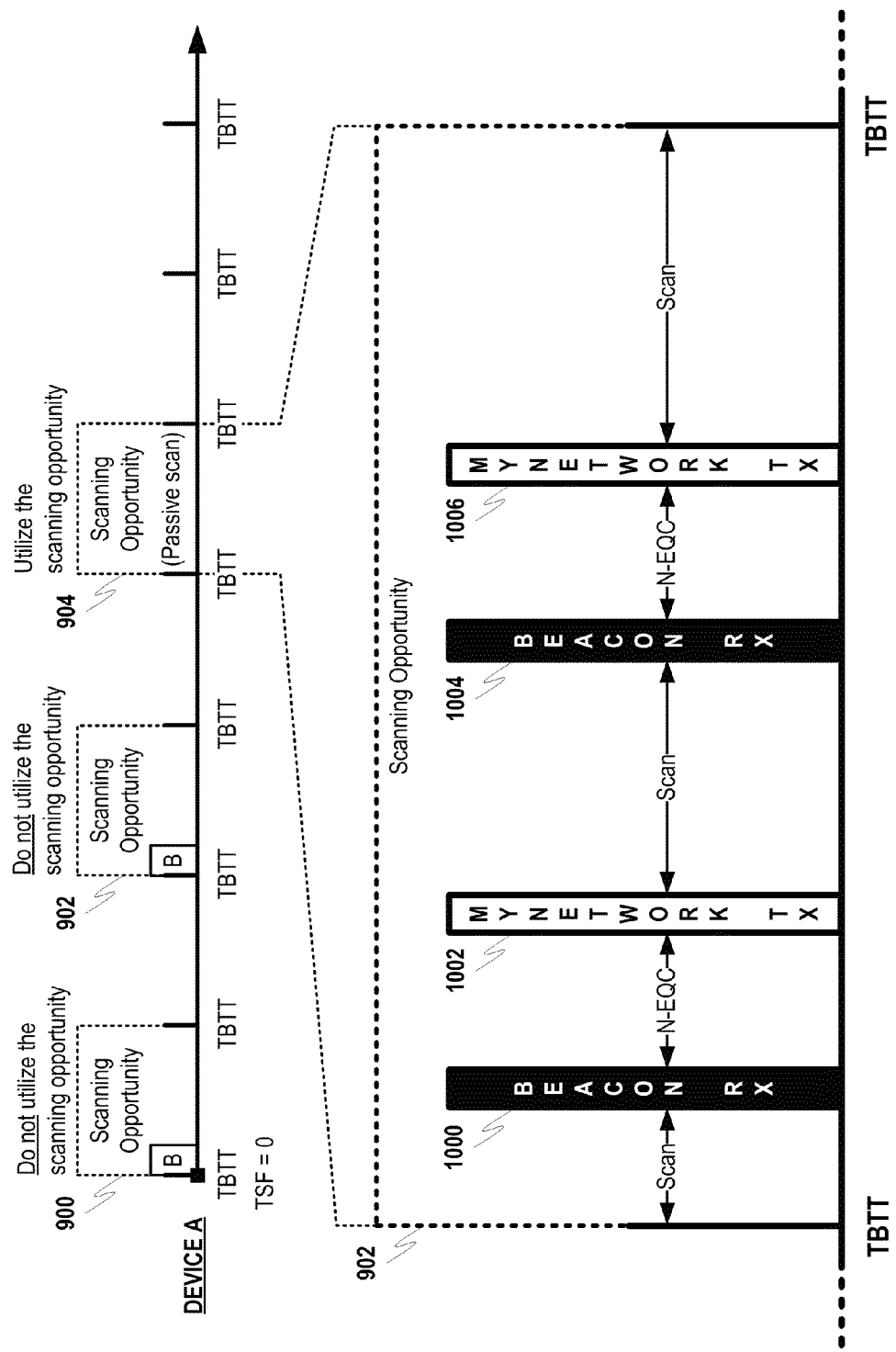
FIG. 10 discloses a more detailed example of scanning opportunity utilization in accordance with at least one example embodiment of the present invention.

Using scanning opportunity 902 disclosed in FIG. 9 as a basis, an example of activities that may occur when a scanning opportunity is utilized is disclosed in FIG. 10. When utilizing a scanning opportunity Device A may, at some instance prior to commencing passive scanning, prepare a network information message for transmission, which is represented in FIG. 10 as a "MyNetwork" message. A network information message may comprise connectivity information usable by apparatuses outside of the network for communicating with the network. For example, network information messages may comprise timing information that would allow apparatuses operating outside of the network to synchronize to network timing. Further, the network information message may also comprise information pertaining to one or more diluted beacon periods, which would allow apparatuses not only to synchronize to network timing, but also to operate in accordance with a diluted beacon period already established in the network.

For example, network information messages may comprise network information such as contained in beacon frames including network size, basic service set identifiers (BSSID), network operating frequency, etc. Apparatuses in a network to which this packet is transmitted by a scanning device may process this frame in a manner similar to the processing of in-network scanning reports. Devices may individually decide whether to react to the discovery of the new network. If an apparatus decides to react to the discovery, the apparatus will begin operating in the found network. Apparatuses may either also continue operating in the old network or move all its operations to the new network. In the case of the former, the apparatus may form a kind of gateway between the two networks. In the case of the latter, the apparatus informs the other devices in the old network about its decision to leave the network.

An example of activities that may occur during scanning opportunity 902 is also described in FIG. 10. When an apparatus that is passively scanning receives beacon signal 1000 from another network, it may initiate a transmission (Tx) and/or broadcast of a network information message, or a similar dedicated data frame, comprising connectivity information corresponding to a network in which the passively scanning apparatus is currently operating. The data frame in the disclosed example is "MyNetwork" announcement frame 1002, as the frame may be used to inform newly encountered networks about the presence of the existing network (e.g., the network to which the passively scanning apparatus belongs). The frame may be transmitted in a manner similar to data frames that would be transmitted by apparatuses operating within the network (e.g., including basic contention rules). Further, the MAC layer may be instructed that the frame needs to be made to look like a frame sent from any device operating in the other network (e.g., the network ID would need to be set to the value used in the other network). The network ID information of the other network may be taken from the beacon signal received by the scanner that triggered the scanner to transmit the MyNetwork frame.

The above process may also apply if a dedicated management frame is specified. Normal frame reception rules may apply when receiving MyNetwork frames, since by default the transaction would involve normal data type frames. Apparatuses would not be expected to handle MyNetwork frames any differently from other data type frames. Further, the frames may be delivered to the host for further processing similar to other data type frames. Alternatively, a new management frame may be specified for this purpose. Operation may continue in the manner shown at 1004 and 1006 in FIG. 10 for the duration of scanning opportunity 902.

Apparatuses utilizing scanning opportunities to passively scan for other networks may transmit MyNetwork frames (e.g., 1002 and 1006) upon receiving beacon frames from other networks (e.g., a beacon with the same service set identifier (SSID) as the network in which the apparatus is operating). When scanning is initiated, apparatuses may first prepare a MyNetwork frame ready for transmission and then enter into the non-empty queue contention state. Beacon frames received from other networks may trigger normal channel access procedures, as defined by the wireless communication protocol being used, that may then conclude with MyNetwork frame transmission. Once an apparatus has broadcasted a MyNetwork frame, it may resume passive scanning and prepare another MyNetwork frame for the next encounter (e.g., further beacons received from other networks). After a scanning opportunity expires, the apparatus may reset channel access states and flush remaining MyNetwork frames from transmission queues.

Figure 11:
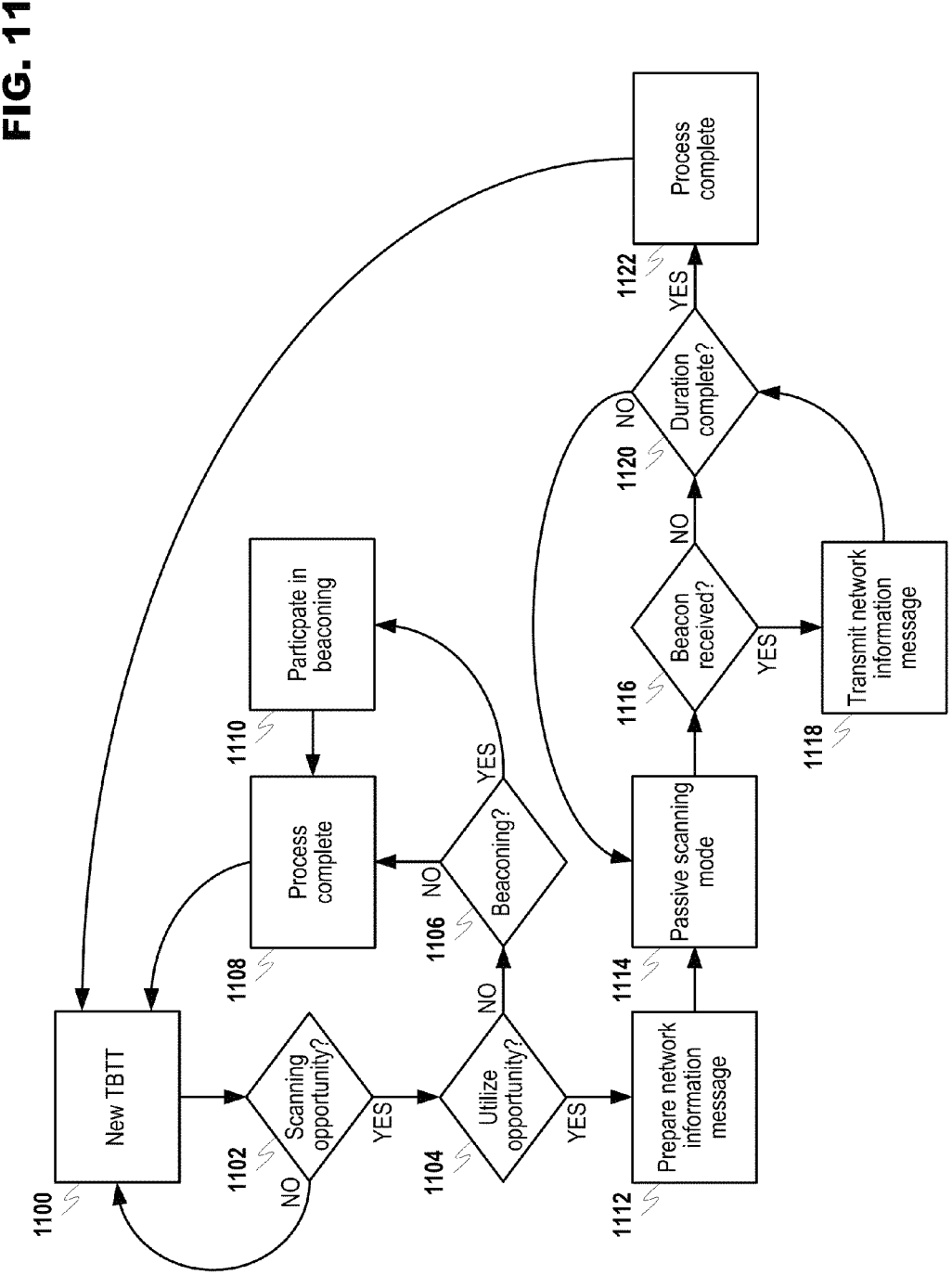
FIG. 11 discloses a flowchart for an example communication control process in accordance with at least one example embodiment of the present invention.

A flowchart of an example communication process in accordance with at least one embodiment of the present invention is disclosed in FIG. 11. In step 1100 a new TBTT may be identified in an apparatus. A determination may then be made in step 1102 as to whether a scanning opportunity is being initiated with the current TBTT (e.g., does the current identified TBTT correspond to an integer multiple of the network beacon signal interval that is configured in aScanInterval). If a scanning opportunity is not initiated in step 1102, the process may return to step 1100 to await the next network beacon signal interval. Alternatively, if a scanning opportunity is commencing the process may proceed to step 1104.

In step 1104 a further determination may be made as to whether to utilize the scanning opportunity. This determination may be made in based on various factors such as probability calculations, other communication-related activities occurring in the apparatus, etc. If the apparatus decides not to utilize the scanning opportunity then in step 1106 the apparatus may perform a further determination regarding whether to participate in network beaconing in step 1106. If the apparatus elects not to participate in network beaconing, then the process may terminate in step 1008 and return to step 1100 until the next beacon period is identified. If the apparatus does decide to participate in network beaconing, then in step 1110 the apparatus may participate in standard beaconing processes as defined by the wireless communication protocol being employed in the network, and the process may then terminate in step 1108 after network beaconing has been completed or the scanning opportunity expires, whichever happens first.

Alternatively, the apparatus may decide in step 1104 to utilize a scanning opportunity. The process may then proceed to step 1112 where a network information message is prepared. Network information messages may include, for example, connectivity information usable by apparatuses that want to join the network. Connectivity information may comprise timing information that would be usable by other apparatuses for synchronizing to the timing of the network, and in some instances, information about diluted beacon periods already established in the network. A passive scanning mode may be initiated in step 1114 in which the apparatus scans for beacon signals corresponding to other apparatuses and/or networks in step 1116. These beacon signals may be recognizable, for example, because they contain an SSID different from the network of the scanning apparatus. If a beacon signal is received, the apparatus may transmit (e.g., wirelessly broadcast) the network information message in step 1118. Network information messages may be transmitted/broadcast based on communication control procedures established in the network (e.g., after contention for access to communication channels) and may include the SSID of another network that was taken from the previously received beacon. Passive scanning may continue in step 1114 until expiration in step 1120. The process may then terminate in step 1122 and return to step 1100 in preparation for the next TBTT to be identified.

Further to the above, the various example embodiments of the present invention are not strictly limited to the above implementations, and thus, other configurations are possible.

For example, apparatuses in accordance with at least one embodiment of the present invention may comprise means for identifying a scanning opportunity for an apparatus, the scanning opportunity being based upon an integer multiple of a network beacon signal interval, means for, if a determination is made in the apparatus to utilize the scanning opportunity, preparing a network information message and entering a passive scanning mode for the duration of the scanning opportunity, and means for, if a beacon message corresponding to another network is received in the apparatus while in the passive scanning mode, transmitting the network information message.

At least one other example embodiment of the present invention may include electronic signals that cause apparatuses to identify a scanning opportunity for an apparatus, the scanning opportunity being based upon an integer multiple of a network beacon signal interval, if a determination is made in the apparatus to utilize the scanning opportunity, prepare a network information message and entering a passive scanning mode for the duration of the scanning opportunity, and if a beacon message corresponding to another network is received in the apparatus while in the passive scanning mode, transmit the network information message.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    identifying a scanning opportunity for an apparatus, the scanning opportunity being based upon an integer multiple of a network beacon signal interval of a network in which the apparatus is operating;
    if a determination is made in the apparatus to utilize the scanning opportunity, preparing a network information message and entering a passive scanning mode for the duration of the scanning opportunity; and
    if a beacon message corresponding to another network is received in the apparatus while in the passive scanning mode, initiating transmission of the network information message,
    wherein the network information message comprises information corresponding to the network in which the apparatus is operating and contains information usable by other apparatuses when synchronizing to the beacon signal interval of the network, and
    wherein the network information is prepared prior to entering the passive scanning mode.

2. The method of claim 1, wherein a duration for the scanning opportunity is defined as an integer multiple of the network beacon signal interval.

3. The method of claim 1, wherein if a determination is made to not utilize the scanning opportunity the apparatus is permitted to participate in beaconing within the network.

4. The method of claim 3, wherein when the apparatus participates in beaconing within the network during duration of the scanning opportunity, the apparatus does not initiate transmission of data frames during duration of the scanning opportunity.

5. The method of claim 1, wherein the network information message is modified by the apparatus prior to transmission to contain a network identifier corresponding to the another network, the network identifier being derived in the apparatus from the received beacon message.

6. The method of claim 1, wherein the information usable by other apparatuses when synchronizing to the beacon signal interval of the network further comprises diluted beacon signal interval information.

7. The method of claim 1, wherein initiating transmission comprises participating in contention for access to a wireless communication medium.

8. The method of claim 1, wherein when entering the passive scanning mode the apparatus does not participate in beaconing for the duration of the scanning opportunity.

9. The method of claim 1, wherein an indication of the beacon message received from the another network is not transmitted to the network in which the apparatus is operating.

10. The method of claim 1, wherein the information is usable by other apparatuses for receiving a next beacon transmission when synchronizing to the beacon signal interval of the network.

11. A computer program product comprising computer executable program code recorded on a non-transitory computer readable storage medium, the computer executable program code comprising:
    code configured to cause an apparatus to identify a scanning opportunity, the scanning opportunity being based upon an integer multiple of a network beacon signal interval of a network in which the apparatus is operating;
    code configured to, if a determination is made in the apparatus to utilize the scanning opportunity, cause the apparatus to prepare a network information message and enter a passive scanning mode for the duration of the scanning opportunity; and
    code configured to, if a beacon message corresponding to another network is received in the apparatus while in the passive scanning mode, cause the apparatus to transmit the network information message,
    wherein the network information message comprises information corresponding to the network in which the apparatus is operating and contains information usable by other apparatuses when synchronizing to the beacon signal interval of the network, and
    wherein the network information is prepared prior to entering the passive scanning mode.

12. The computer program product of claim 11, wherein a duration for the scanning opportunity is defined as an integer multiple of the network beacon signal interval.

13. The computer program product of claim 11, further comprising code configured to, if a determination is made to not utilize the scanning opportunity, cause the apparatus to participate in beaconing within the network.

14. The computer program product of claim 13, further comprising code configured to, if the apparatus participates in beaconing within the network during duration of the scanning opportunity, cause the apparatus to not initiate transmission of data frames during duration of the scanning opportunity.

15. The computer program product of claim 11, further comprising code configured to cause the apparatus to modify the network information prior to transmission to contain a network identifier corresponding to the another network, the network identifier being derived in the apparatus from the received beacon message.

16. The computer program product of claim 11, wherein the information usable by other apparatuses for synchronizing to the network further comprises diluted beacon signal interval information.

17. The computer program product of claim 11, wherein initiating transmission comprises participating in contention for access to a wireless communication medium.

18. The computer program product of claim 11, further comprising code configured to cause the apparatus to not participate in beaconing for the duration of the scanning opportunity when entering the passive scanning mode.

19. The computer program product of claim 11, wherein an indication of the beacon message received from the another network is not transmitted to the network in which the apparatus is operating.

20. The computer program product of claim 11, wherein the information is usable by other apparatuses for receiving a next beacon transmission when synchronizing to the beacon signal interval of the network.

21. An apparatus, comprising:
at least one processor; and
at least one memory including executable instructions, the at least one memory and the executable instructions being configured to, in cooperation with the at least one processor, cause the apparatus to perform at least the following:
identify a scanning opportunity for an apparatus, the scanning opportunity being based upon an integer multiple of a network beacon signal interval of a network in which the apparatus is operating;
if a determination is made in the apparatus to utilize the scanning opportunity, prepare a network information message and entering a passive scanning mode for the duration of the scanning opportunity; and
if a beacon message corresponding to another network is received in the apparatus while in the passive scanning mode, transmit the network information message,
wherein the network information message comprises information corresponding to the network in which the apparatus is operating and contains information usable by other apparatuses when synchronizing to the beacon signal interval of the network, and
wherein the network information is prepared prior to entering the passive scanning mode.

22. The apparatus of claim 21, wherein a duration for the scanning opportunity is defined as an integer multiple of the network beacon signal interval.

23. The apparatus of claim 21, wherein if a determination is made to not utilize the scanning opportunity the apparatus is permitted to participate in beaconing within the network.

24. The apparatus of claim 23, wherein when the apparatus participates in beaconing within the network during duration of the scanning opportunity, the apparatus does not initiate transmission of data frames during duration of the scanning opportunity.

25. The apparatus of claim 21, wherein the network information message is modified by the apparatus prior to transmission to contain a network identifier corresponding to the another network, the network identifier being derived in the apparatus from the received beacon message.

26. The apparatus of claim 21, wherein the information usable by other apparatuses for synchronizing to the network further comprises diluted beacon signal interval information.

27. The apparatus of claim 21, wherein initiating transmission comprises participating in contention for access to a wireless communication medium.

28. The apparatus of claim 21, wherein when entering the passive scanning mode the apparatus does not participate in beaconing for the duration of the scanning opportunity.

29. The apparatus of claim 21, wherein an indication of the beacon message received from the another network is not transmitted to the network in which the apparatus is operating.

30. The apparatus of claim 21, wherein the information is usable by other apparatuses for receiving a next beacon transmission when synchronizing to the beacon signal interval of the network.

* * * * *